United States Patent [19]

Okubo

[11] 4,373,407

[45] Feb. 15, 1983

[54] CLUTCH MECHANISM FOR POWER TRANSMISSION SYSTEM

[75] Inventor: Kiyokazu Okubo, Wako, Japan

[73] Assignee: Honda Giken Kogyo Kabushiki Kaisha, Tokyo, Japan

[21] Appl. No.: 208,416

[22] Filed: Nov. 19, 1980

[30] Foreign Application Priority Data

| Nov. 19, 1979 [JP] | Japan | 54-149694 |
| Nov. 19, 1979 [JP] | Japan | 54-149695 |
| Nov. 19, 1979 [JP] | Japan | 54-149696 |
| Dec. 26, 1979 [JP] | Japan | 54-169645 |

[51] Int. Cl.³ .................. F16H 35/04; F16D 47/04
[52] U.S. Cl. .................. 74/650; 192/48.92; 192/50
[58] Field of Search .................. 74/650; 192/48.92, 50

[56] References Cited

U.S. PATENT DOCUMENTS

| 943,746 | 12/1909 | Hatfield, Jr. | 74/650 |
| 1,049,869 | 1/1913 | Kendrick | 74/650 |
| 1,366,805 | 1/1921 | Jex | 74/650 |
| 2,440,975 | 5/1948 | Robbins | 74/650 |

FOREIGN PATENT DOCUMENTS

| 520751 | 1/1956 | Canada | 192/48.92 |
| 333928 | 3/1921 | Fed. Rep. of Germany | 74/650 |

Primary Examiner—Allan D. Herrmann
Attorney, Agent, or Firm—Irving M. Weiner; Pamela S. Burt; John L. Shortley

[57] ABSTRACT

A clutch mechanism for a power transmission system including one drive member and two driven members, in which at least one pair of simple clutch members are interposed between the drive member and two driven members so as to transmit power from the drive member to the driven members independently of each other. The pair of clutch members may comprise a pair of pawls, rollers, or sprags. The clutch mechanism effectively performs conventional differential and differential-locking functions with a simplified construction.

8 Claims, 38 Drawing Figures

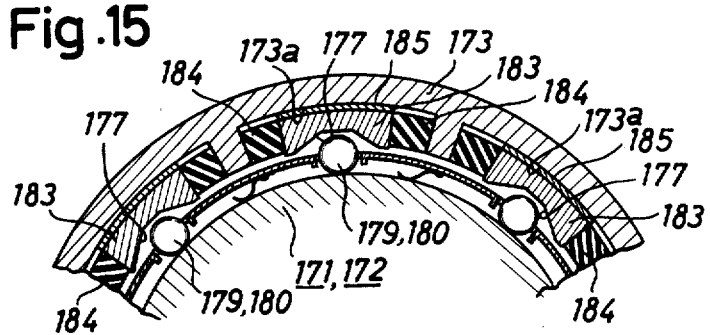
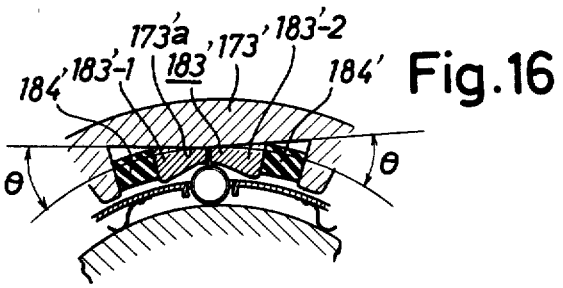
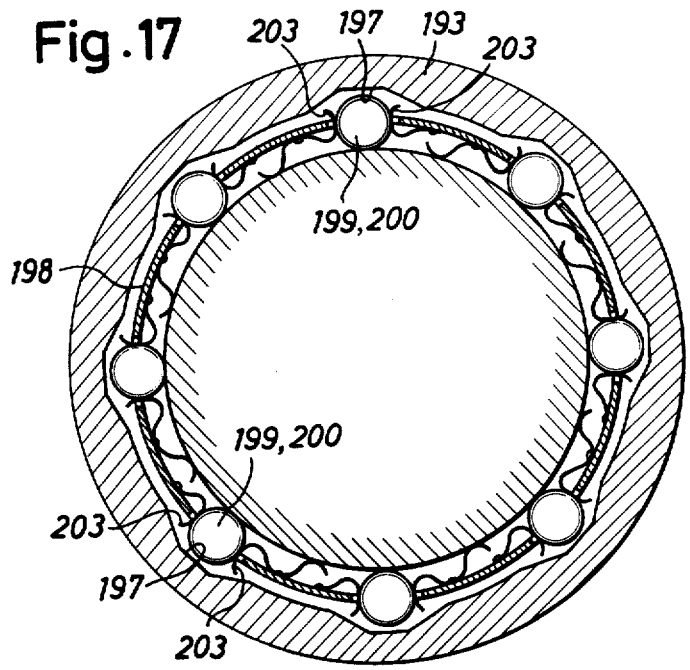

4,373,407

CLUTCH MECHANISM FOR POWER TRANSMISSION SYSTEM

BACKGROUND OF THE INVENTION

1. Field of the Invention

The present invention relates to a clutch mechanism for a power transmission system, which is provided with one drive member, two driven members, and clutch members for effecting connection and disconnection between the drive and driven members. More particularly, the invention relates to a clutch mechanism for a power transmission system, which is suitable for use as the differential locking mechanism of a vehicle.

2. Description of Relevant Art

Various types of systems or devices requiring a clutch mechanism are required to have a special clutch action. For example, one such system or device is equipped with one drive member and two driven members which are rotationally driven by the drive member. Such a system or device can transmit power to the two driven members with both forward and backward rotation of the drive member, so that the clutch thereof functions as a two-way clutch. Moreover, if additional power such as an external force is exerted upon one of the driven members, such driven member can be operatively disassociated from the drive member, while the other driven member remains locked and connected with the drive member, so that the former driven member is permitted to freely rotate at a higher speed than the drive member.

A typical exemplary application wherein a clutch mechanism providing the above-described special clutch action is employed is in a three- or four-wheeled vehicle or the like which is provided with two drive wheels. In such a vehicle, a propeller shaft (i.e., the drive member) which is rotationally driven by the power of a prime mover or an engine, is connected with two axle shafts (i.e., the driven members), which are connected to respective drive wheels, when the propeller shaft rotates in either a forward or backward direction, so that the vehicle can be moved forwardly or backwardly or can be stopped by braking the engine. When the vehicle turns, the axle shaft at the turning outer side is permitted to freely rotate, while the connection between the propeller shaft and the axle shaft at the turning inner side is retained, so that the turning operation can be effected. Moreover, even when one of the drive wheels encounters slippery conditions such as on a muddy road, the vehicle can continue its travel by the driving force of the remaining drive wheel. Therefore, the clutch mechanism thus far described can perform substantially the same function as a conventional differential locking mechanism.

It is well known that conventional differential locking mechanisms are very complicated in construction and enlarged in size. Such mechanisms comprise a large number of parts including smaller and larger gears which are assembled in a gear box, and a multi-layered friction clutch which operates to prevent most of the engine power from being consumed by a drive wheel trapped on a slippery road surface. Moreover, it is impossible for such mechanisms to provide an entirely satisfactory differential locking effect due to inherent slippage of the multi-layered friction clutch.

The present invention is directed towards the provision of a novel clutch mechanism which very effectively provides the aforesaid special clutch action.

SUMMARY OF THE INVENTION

The present invention provides a clutch mechanism for a power transmission system, including one drive member and two driven members, wherein a pair of clutch members are interposed between the drive member and the two driven members, operatively connecting the drive member with respective driven members during both forward and backward rotation of the drive member, thereby permitting either one of the driven members, which is moving at a higher speed than the drive member, to be free with respect to the drive member while the other one of the driven members remains connected with the drive member.

In accordance with the present invention, it is therefore possible to employ the clutch mechanism as a differential locking mechanism of a vehicle, which is desirably simplified in construction and compact in size, and to uniformly distribute and transmit engine torque to two drive wheels of the vehicle, even when either one of the drive wheels encounters a slippery road condition which gives the drive wheel a light load, so that a complete differential locking effect is provided.

An object of the present invention is to provide a clutch mechanism for a power transmission system, which employs pawls, rollers or sprags as the aforesaid clutch members.

The present invention will be described in greater detail hereinbelow in connection with preferred embodiments thereof. Further objects and advantages of the invention will become apparent from the following detailed description, when read in conjunction with the accompanying drawings.

3

Figure 10:
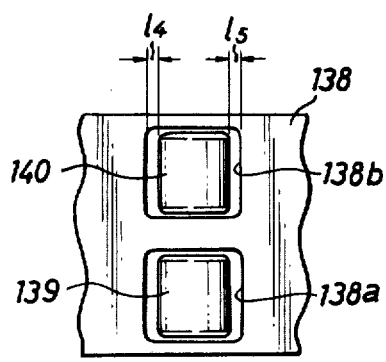

FIG. 10 is a top plan view showing a pair of rollers loosely held in a retainer.

Figure 11:
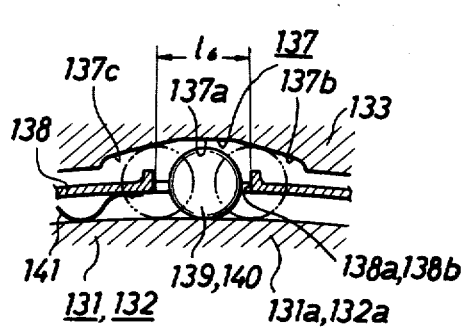

FIG. 11 is a sectioned side elevational view showing the structure in the vicinity of the roller.

Figure 12A:
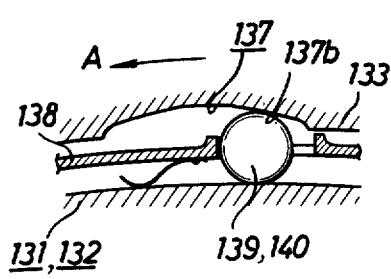

FIGS. 12(a), (b), (c) and (d) are views for explaining the operations of the FIG. 11 structure.

Figure 13:
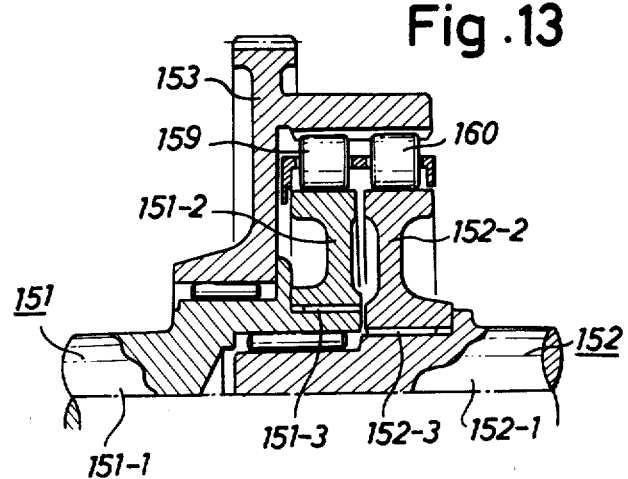

FIG. 13 is a sectioned front elevational view showing an upper half of a roller-type clutch mechanism in accordance with a first modified embodiment of the second basic embodiment.

Figure 14:
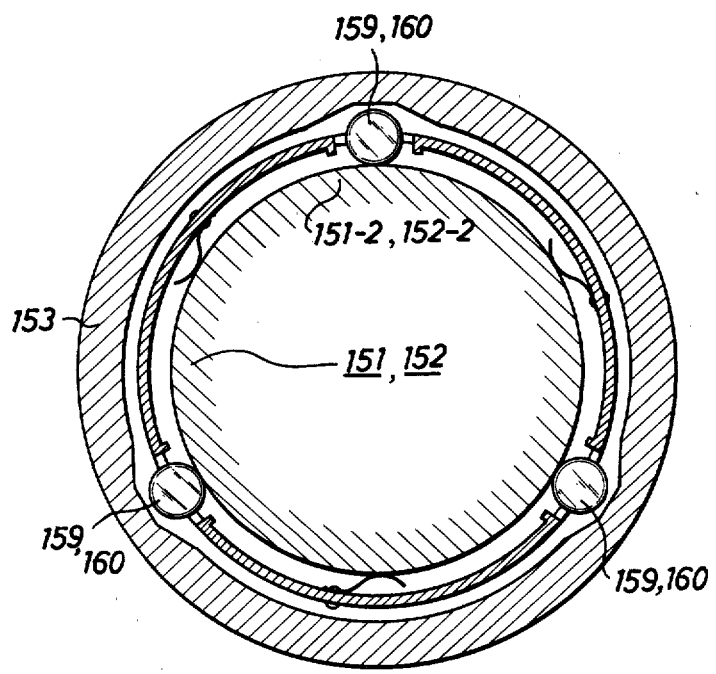

FIG. 14 is a sectioned side elevational view of the structure of FIG. 13.

FIG. 15 is a sectioned side elevational view showing a roller-type clutch mechanism in accordance with a second modified embodiment of the second basic embodiment.

FIG. 16 is a sectioned side elevational view showing a roller-type clutch mechanism in accordance with a third modified embodiment of the second basic embodiment.

FIG. 17 is a sectioned side elevational view showing a roller-type clutch mechanism in accordance with a fourth modified embodiment of the second basic embodiment.

Figure 18:
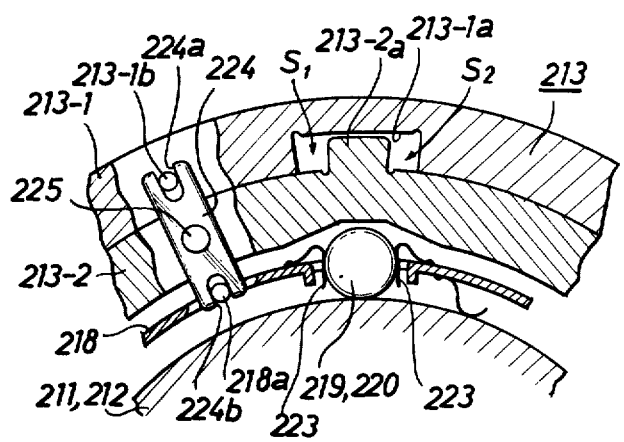

FIG. 18 is a sectioned side elevational view showing a roller-type clutch mechanism in accordance with a fifth modified embodiment of the second basic embodiment.

Figure 19:
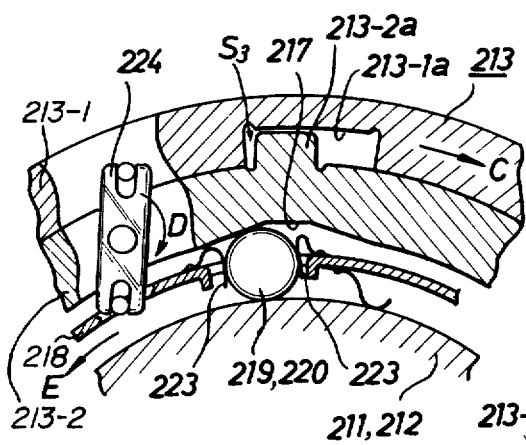
Figure 19:
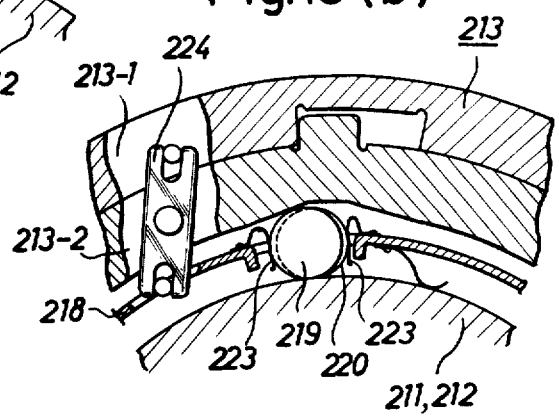

FIGS. 19 (a) and (b) are views for explaining the operation of the FIG. 18 structure.

Figure 20:
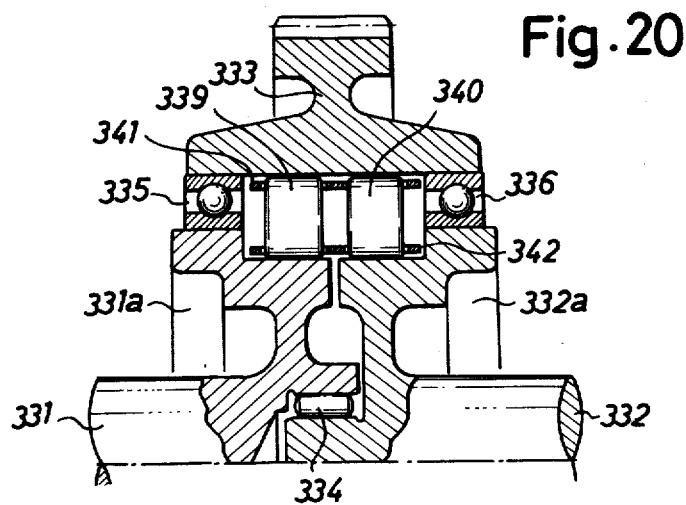

FIG. 20 is a sectioned front elevational view showing a sprag-type clutch mechanism in accordance with a third basic embodiment of the invention, with only the upper half being depicted because of the vertical symmetry thereof.

Figure 21:
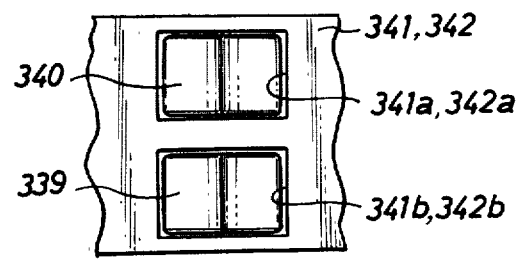

FIG. 21 is a top plan view showing a pair of sprags loosely held in first and second retainers.

Figure 22:
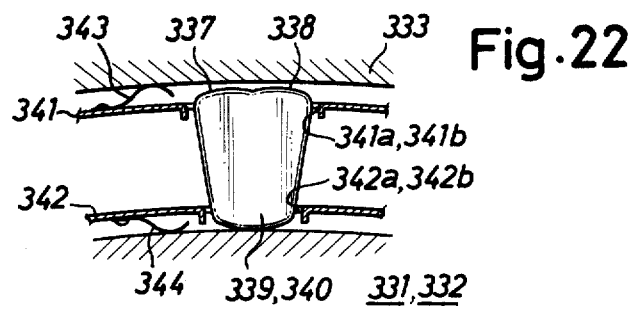

FIG. 22 is a sectioned side elevational view showing the structure in the vicinity of the sprags.

FIGS. 23 (a), (b), (c) and (d) are views for explaining the operation of the FIG. 22 structure.

Figure 24:
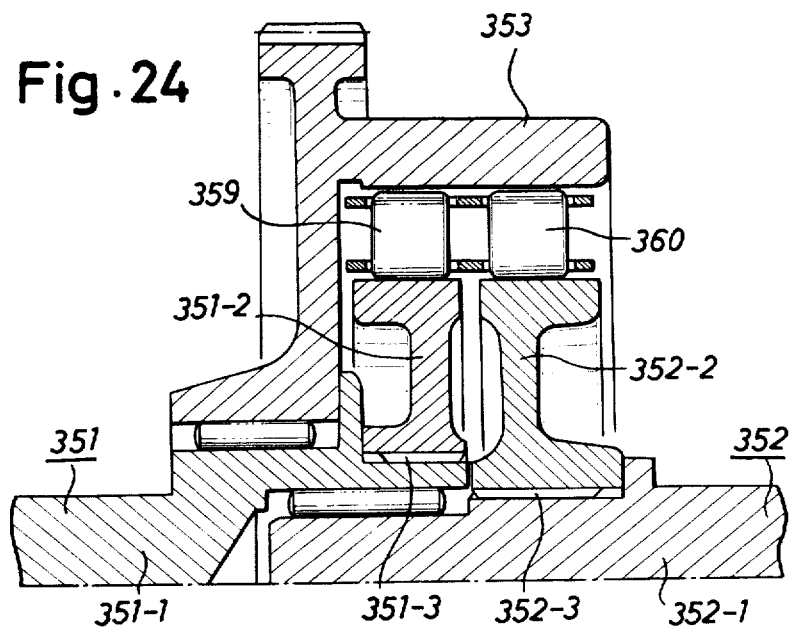

FIG. 24 is a sectioned front elevational view showing an upper half of a sprag-type clutch mechanism in accordance with a first modified embodiment of the third basic embodiment.

Figure 25:
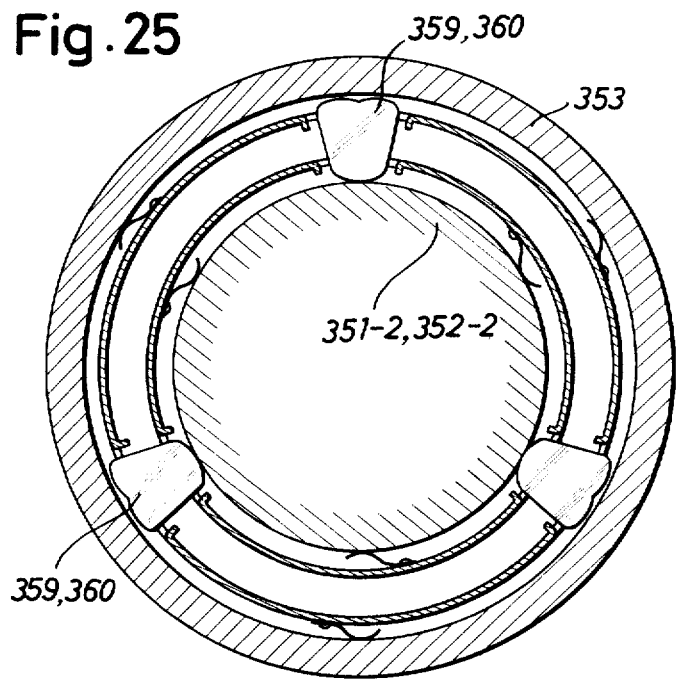

FIG. 25 is a sectioned side elevational view of the FIG. 24 structure.

Figure 26:
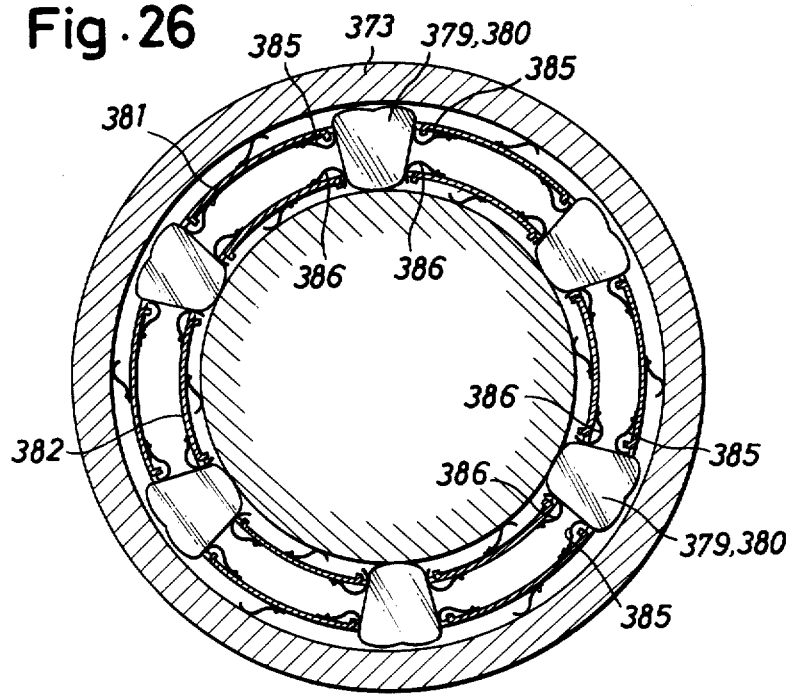

FIG. 26 is a sectioned side elevational view showing a sprag-type clutch mechanism in accordance with a second modified embodiment of the third basic embodiment.

Figure 27:
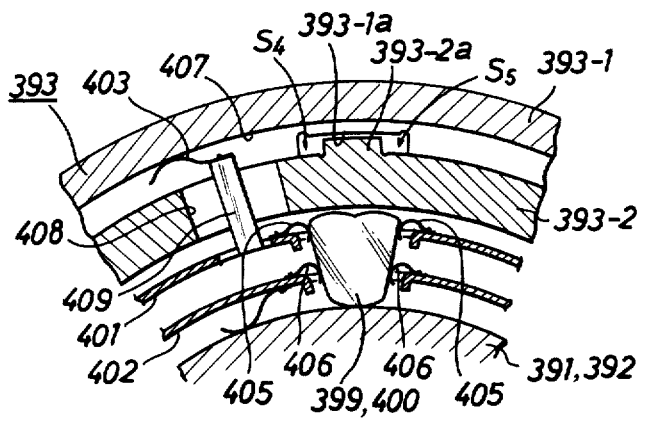

FIG. 27 is a sectioned side elevational view showing a sprag-type clutch mechanism in accordance with a third modified embodiment of the third basic embodiment.

Figure 28:
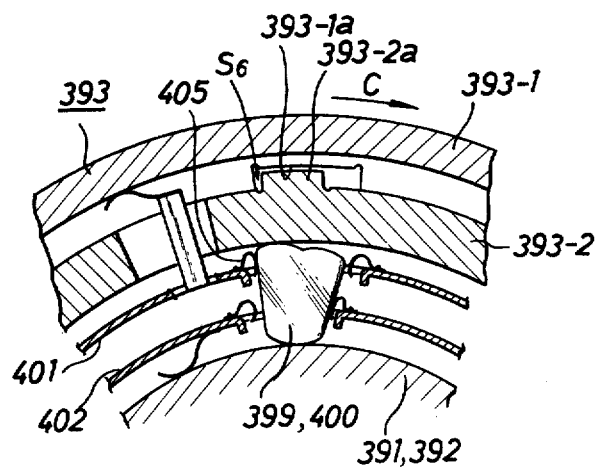
Figure 28:
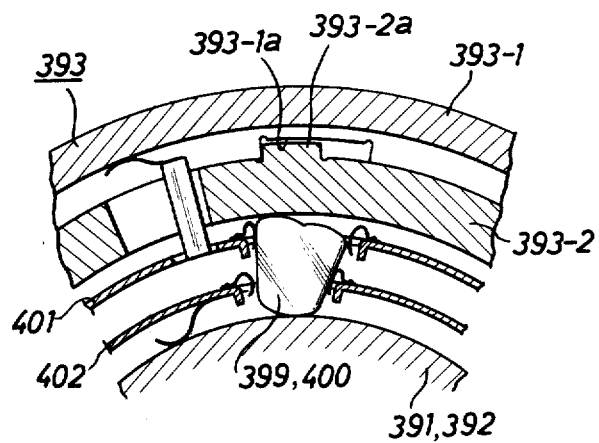

FIGS. 28 (a) and (b) are views for explaining the operation of the FIG. 27 structure.

DETAILED DESCRIPTION OF PREFERRED EMBODIMENTS

Figure 1:
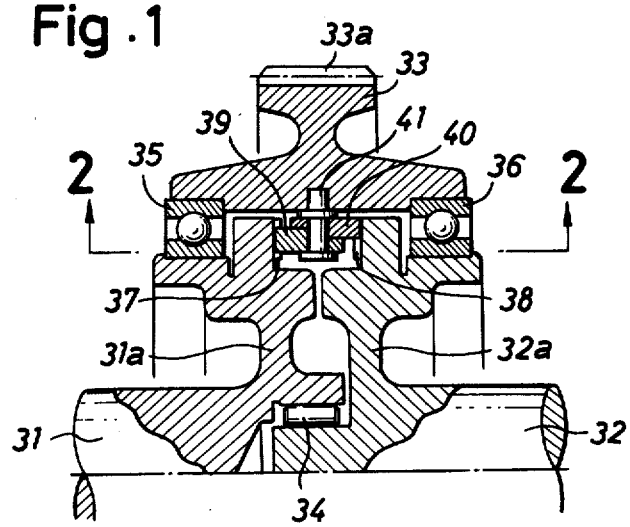
FIG. 1 is a sectioned front elevational view showing a ratchet-type clutch mechanism in accordance with a first basic embodiment of the invention, only the upper half of the mechanism being depicted because of the vertical symmetry thereof.
Figure 2:
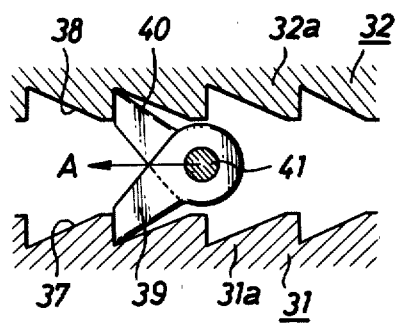
FIG. 2 is a sectioned view taken along line 2—2 of FIG. 1, showing a portion of the clutch mechanism in the vicinity of the pawls thereof.

With reference to FIG. 1, two driven members or shafts 31 and 32 are arranged so as to extend in opposite directions on a common horizontal axis, and are rotatable independently of each other by means of a roller bearing 34 which is sandwiched between the facing shaft ends of shafts 31 and 32. The shaft ends are formed into flanged portions 31a and 32a, on outer circumferential portions of which a drive member 33 having a ring gear shape is rotatably fitted by means of bearings 35 and 36. If the clutch mechanism according to the present invention is to be used as a differential locking mechanism of a vehicle which is equpped with two drive wheels, the driven shafts 31 and 32 function as axle shafts which are equipped with the drive wheels, whereas the drive member 33 functions as a propeller shaft to which the engine power is transmitted through a toothed portion 33a thereof. Formed on horizontally facing inner surfaces of the flanged portions 31a and 32a of the driven shafts 31 and 32 are two rows of helical teeth 37 and 38, respectively, which are inclined in the same direction, as shown in FIG. 2. The helical teeth 37 and 38 are formed continuously all around the flanged portions 31a and 32a, and interposed between the facing rows of helical teeth 37 and 38 are a pair of pawls 39 and 40 which are engageable therewith and function as the clutch members. Pawls 39 and 40 are coaxially hingedly connected to an inner circumferential portion of the drive member 33 by means of a pin 41. In this manner, the pawls 39 and 40 are interposed between the drive member 33 and the driven shafts 31 and 32, respectively, and are hingedly connected in the axial direction of drive member 33. A plurality of pairs of the pawls 39 and 40 are arranged circumferentially between the drive member 33 and the driven shafts 31 and 32.

Figure 3:
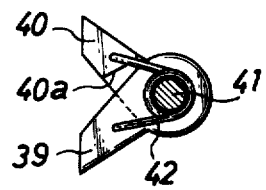
FIG. 3 is a view showing a spring for providing a widening force, as applied on the pawls.
Figure 4A:
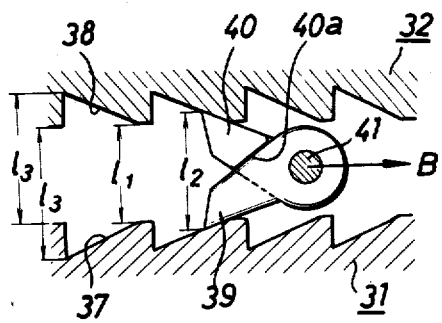
FIGS. 4(a), (b) and (c) are views for explaining the operation of the FIG. 2 structure.

As shown in FIG. 3, the pawls 39 and 40 are always biased to be opened or widened by means of a torsion spring 42, with the minimum angle therebetween being determined by interference at a stepped portion 40a formed in the pawl 40, as clearly shown in FIG. 4(a). A distance between distal ends of the pawls 39 and 40 for the minimum angle therebetween is denoted by $l_2$. This distance $l_2$ is set to be larger than a distance $l_1$ between the protruding portions of opposed helical teeth 37 and 38 and smaller than a distance $l_3$ between one of the protruding portions and the opposed recessed portion of the two helical teeth 37 and 38 having the same protrusion. Thus, the relationship among the distance $l_1$, $l_2$ and $l_3$ is expressed by an inequality of $l_1 < l_2 < l_3$.

When the drive member 33 rotates forwardly so that the pawls 39 and 40 are moved in a direction A, as shown in FIG. 2, the pawls 39 and 40 engage with the helical teeth 37 and 38, respectively, thereby rotating the driven shafts 31 and 32 in the direction A. On the other hand, when the pawls 39 and 40 are moved backwards in a direction B, as shown in FIG. 4(a), by the backwards rotation of drive member 33, the pawls 39 and 40 assume their closest relative angular position but continue their engagement with the helical teeth 37 and 38 so that the driven shafts 31 and 32 are rotated in the direction B. In other words, the pawls 39 and 40 transmit the power to the driven shafts 31 and 32 in both the forward and backward directions of rotation of drive member 33 so as to function as a two-way clutch.

Figure 4B:
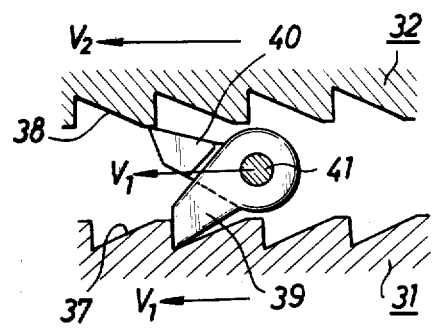
Figure 4C:
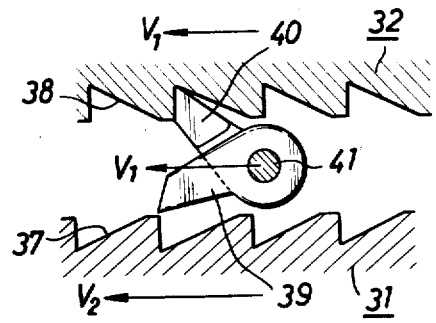

If the axle shaft at the turning inner side rotates at a lower speed and the other axle shaft at the turning outer side rotates at a higher speed during turning of the vehicle, for example, the helical teeth 38 of the driven shaft 32, which is rotating at a higher speed $V_2$ than the speed $V_1$ of the drive member 33 by the action of the external force, as shown in FIG. 4(b), ride over the pawl 40 while forcing same towards its closed direction. As a result, the driven shaft 32 rotates at the speed $V_2$ freely of the pawls 39 and 40 and the drive member 33, whereas only the other driven shaft 31 receives the power from the drive member 33 through the pawl 39 so that it is rotated at the speed $V_1$ by such power. On the other hand, if the driven shaft 31 is positioned at the side of the higher speed $V_2$, as shown in FIG. 4(c), the helical teeth 37 ride over the pawl 39 to thereby permit the driven shaft 31 to freely rotate.

Figure 5:
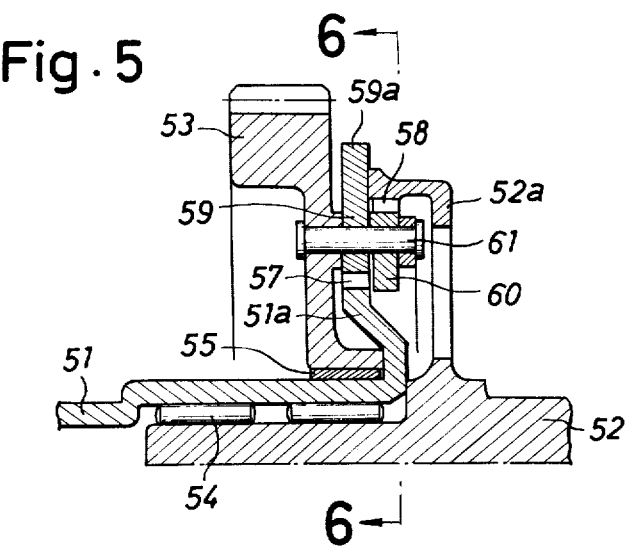
FIG. 5 is a sectioned front elevational view showing an upper portion of a ratchet-type clutch mechanism in accordance with a first modified embodiment of the first basic embodiment.
Figure 6:
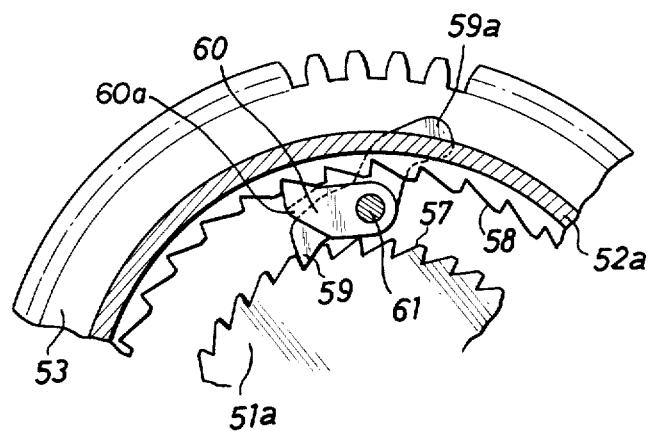
FIG. 6 is a sectioned view taken along line 6—6 of FIG. 5.

With reference to FIG. 5, in a first modified embodiment of the ratchet-type clutch mechanism a driven shaft 52 has its end rotatably fitted in a hollow cylindrical end of a driven shaft 51 via roller bearings 54. A drive member 53 is rotatably fitted through a bearing bush 55 on an outer circumferential portion of the driven shaft 51. Driven shaft 51 has its end formed into a flanged portion 51a whereas the other driven shaft 52 is formed with a dish-shaped flanged portion 52a which has a larger diameter than that of the flanged portion 51a. The flanged portions 51a and 52a are formed on the respective outer and inner circumferential portions thereof with rows of helical teeth 57 and 58, respectively, which are shifted apart in the axial direction but face each other in the radial direction. A pin 61 is horizontally attached to the drive member 53, by which pawls 59 and 60 engageable with and disengageable from the helical teeth 57 and 58 are hingedly connected to the drive member 53. As a result, the engaging and disengaging directions between the pawls 59, 60 and the helical teeth 57, 58 form a right angle with respect to the axial directions of the horizontal driven shafts 51 and 52. The pawl 59 engageable with the helical teeth 57 at the radially inner side carries a balance weight 59a which extends apart from the pin 61, as shown in FIG. 6. Balance weight 59a is used to offset the centrifugal force which is generated by rotation of the drive member 53, thereby urging the pawl 59 radially outwardly against the elastic force of a spring biasing the pawls 59 and 60 to be opened, the minimum angle between pawls 59 and 60 being determined by interference at a stepped portion 60a formed in the pawl 60. In this manner the pawl 59 may be brought into and out of engagement with the helical teeth 57 in the manner described hereinabove. Thus, the desired clutch action can be effected by providing the pawl 59 with the balance weight 59a, even with the opening direction of the pawls 59 and 60 being disposed at a right angle with respect to the case of the power transmission system according to the first basic embodiment shown in FIG. 1.

Figure 7:
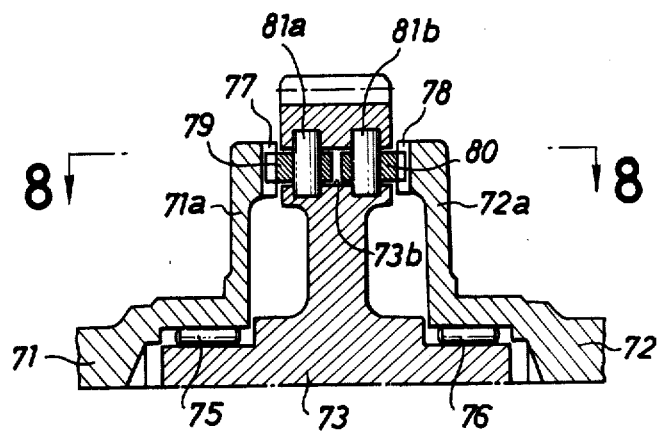
FIG. 7 is a sectioned front elevational view showing an upper portion of a ratchet-type clutch mechanism in accordance with a second modified embodiment of the first basic embodiment.
Figure 8:
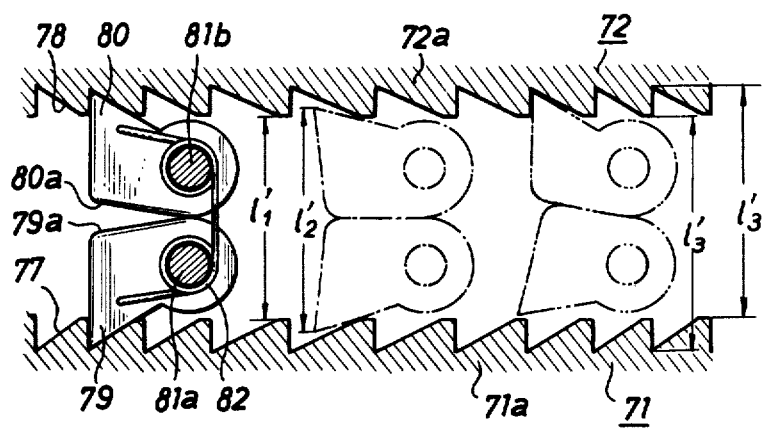
FIG. 8 is a sectioned view taken along line 8—8 of FIG. 7, showing a portion of the structure in the vicinity of the pawls.

With reference to FIG. 7, in a second modified embodiment of the ratchet-type clutch mechanism, left and right driven shafts 71 and 72 have their ends formed into flanged portions 71a and 72a which are symmetrical. The facing inner surfaces of the flanged portions 71a and 72a are formed on circumferential portions thereof with two rows of helical teeth 77 and 78, respectively, and a disc-shaped drive member 73 is arranged between flanged portions 71a and 72a, such that the driven shafts 71 and 72 are rotatably mounted on the drive member 73 through roller bearings 75 and 76, respectively. In a throughhole 73b which is horizontally formed in the drive member 73 in the vicinity of the outer circumferential portion thereof, there are fixed two radial pins 81a and 81b, which respectively hingedly support pawls 79 and 80. Facing back portions 79a and 80a of the pawls 79 and 80 define an open angle when the pawls 79 and 80 are forced into engagement with the helical teeth 77 and 78 by the bias force of a spring 82, as shown in FIG. 8. However, when the pawls 79 and 80 are moved toward each other by the teeth 77 and 78, the pawl back portions 79a and 80a close so as to establish a minimum distance between the leading ends of the pawls 79 and 80 which is denoted at $l'_2$. The distance $l'_2$ has a relationship with the distance $l'_1$ between the protruding portions of the helical teeth 77 and 78 and with the distance $l'_3$ between the protruding portions of one row of helical teeth and the recessed portions of the other row of helical teeth which is expressed by an inequality of $l'_1 < l'_2 < l'_3$. As a result, the same action as the clutch action described hereinabove with reference to FIG. 4 as well as with reference to FIG. 2 is provided.

The above-described first basic embodiment and modifications thereof has been directed toward a clutch mechanism of the ratchet type wherein pawls are employed as the clutch member. A clutch mechanism employing a roller-type clutch member will be described hereinbelow with reference to FIGS. 9–19 in accordance with a second basic embodiment of the invention and modifications thereof.

Figure 9:
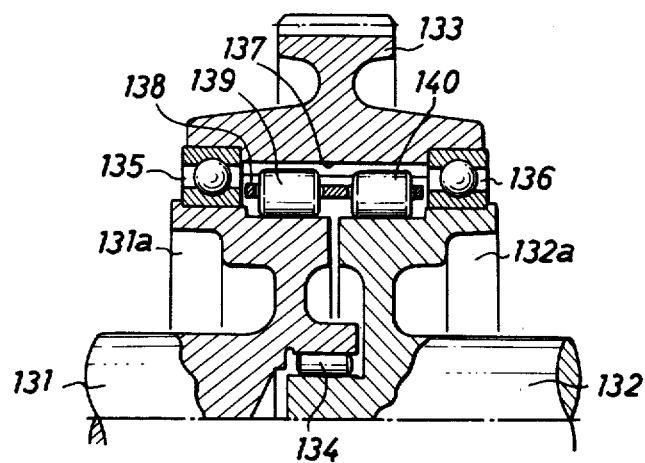
FIG. 9 is a sectioned front elevational view showing a roller-type clutch mechanism in accordance with a second basic embodiment of the invention, with only the upper half being depicted because of the vertical symmetry thereof.

As shown in FIG. 9, a drive member 133 having the shape of a ring gear is rotatably fitted through bearings 135 and 136 upon outer circumferential portions of flanged end portions 131a and 132a of driven shafts 131 and 132, which in turn are rotatable relative to each other by means of a roller bearing 134. A pair of rollers 139 and 140 are arranged for the driven shafts 131 and 132, respectively, between an inner circumferential portion of the drive member 133 and outer circumferential portions of the flanged portions 131a and 132a. As shown in FIG. 11, an inner circumferential portion of the drive member 133 is formed with a recessed cam surface 137 which extends a sufficient width in the axial direction of the drive member 133 so as to accommodate the paired rollers 139 and 140, as shown in FIG. 9. The recessed cam surface 137 is deepest at the center portion 137a thereof, in which the rollers 139 and 140 are loosely received during normal operation (i.e., when the drive member 133 is not rotating). The recessed cam surface 137 is formed symmetrically in front and at the back of the center portion 137a in the forward and backward directions of the drive member 133 with sloped surface portions 137b and 137c having depths which are gradually reduced from the center portion 137a so that the rollers 139 and 140 are locked when they have rolled into the sloped portions 137b and 137c, thus effecting connections between the member 133 and the driven shafts 131 and 140, whereby a neutral stroke $l_6$ between the two front and rear locked positions is provided along the recessed cam surface 137. The paired rollers 139 and 140 are commonly and loosely held in a retainer 138, which is formed with a collar shape in the rotating direction of the drive member 133, so as to be freely movable by a distance corresponding to gaps $l_4$ and $l_5$ in the rotating direction of drive member 133 within apertures 138a and 138b, which are formed in the retainer 138, as shown in FIG. 10. The stroke, which is determined by the gaps $l_4$ and $l_5$ to permit the rollers 139 and 140 to move, is smaller than the neutral stroke $l_6$ while satisfying an inequality of $l_4 + l_5 < l_6$. As shown in FIG. 11, a leaf spring 141 is connected at one end thereof to the retainer 138 and at the other end thereof elastically contacts the driven shafts 131 and 132 so that the retainer 138 is in frictional contact with each of the driven shafts 131 and 132 through the leaf spring 141.

When the drive member 133 rotates forwardly in the direction A, as shown in FIG. 12(a), the rollers 139 and 140 are brought into abutment against the sloped surface portion 137b of the recessed cam surface 137 and into their locked conditions, whereby the drive member 133 and the driven shafts 131 and 132 are connected through the paired rollers 139 and 140 so that the power of the drive shaft 133 is transmitted to the driven shafts 131 and 132. On the other hand, when the drive member 133 rotates in the backwards direction B, as shown in FIG. 12(c), the locking operations of the rollers 139 and 140 are effected on the sloped surface portion 137c at the backward locking position of the recessed cam surface 137 so that the driven shafts 131 and 132 are rotated in the backwards direction.

Figure 12B:
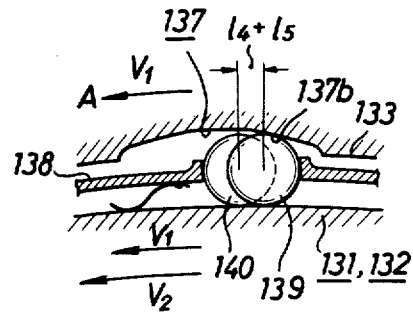
Figure 12C:
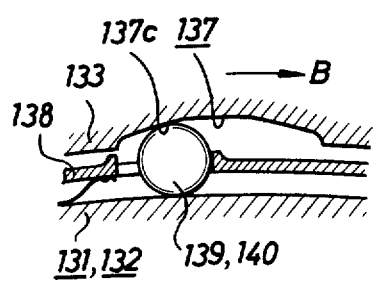

If either of the two driven shafts 131 and 132 moves at a higher speed $V_2$ than a speed $V_1$ of the drive member 131, as shown in FIG. 12(b), while the drive member 131 is rotating forwardly, the roller 140 arranged at the side of the driven shaft rotating at the speed $V_2$ is released from its locked condition shown in FIG. 12(a) and is permitted to roll in the direction A so that the retainer 138 is slidably moved in the direction A while being either pushed by the moving roller 140 or pulled by the driven shaft at the speed $V_2$. Such sliding movement of the retainer 138 is continued until the retainer 138 abuts against the back of the other roller 139 which is still held under its locked condition so that the movement of roller 140, which is released from its locked condition, is regulated by the retainer 138 which is now stopped. Because the stroke of $l_4+l_5$, by which roller 140 is permitted to move within retainer 138, is smaller than the stroke $l_6$ corresponding to the two locked positions defined by the sloped surface portions 137b and 137c of the recessed cam surface 137, the roller 140 cannot move to the backward locked position in the sloped surface portion 137c, but is held under its loose condition at a neutral position along the recessed cam surface 137. As a result, the driven shaft having the speed $V_2$ is freely rotatable relative to the drive shaft 133 whereas only the other driven shaft receives power through the roller 139, which remains in its locked condition, so as to be rotated at the speed $V_1$.

Figure 12D:
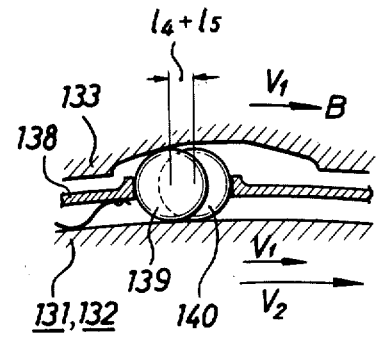

On the other hand, if either of the two driven shafts 131 and 132 assumes the speed $V_2$ while the drive shaft 133 is rotating backwards, it will be understood from FIG. 12(d) that the clutch mechanism can operate in a manner similar to the foregoing operations.

In the constructions thus far described, in order to ensure the power transmission from the drive member to the driven shafts and to assure that the transmission torque capacity is sufficiently large, a plurality of pairs of rollers are arranged in the circumferential direction of the drive member and the driven shafts. Accordingly, all the rollers can be brought into uniform abutment and into their locked conditions even when pitch errors or other errors exist in the recessed cam surfaces of the drive members, which are the same in number as that of the pairs of rollers, and in the apertures of the retainer.

Modified embodiments of the roller-type clutch mechanism in accordance with the second basic embodiment of the invention will be described hereinbelow.

With reference to FIG. 13, in a first modified embodiment of the second basic roller-type embodiment, driven shafts 151 and 152 are constructed of combinations of inner members 151-1 and 152-1 and outer members 151-2 and 152-2, which comprise the shaft bodies and which are jointed by means of splines 151-3 and 152-3 which are loose in the circumferential and radial directions. Three pairs of rollers 159 and 160 are arranged equi-angularly in the circumferential direction, as shown in FIG. 14. When a drive member 153 rotates the centering of the outer members 151-2 and 152-2 i effected, when all the rollers 159 and 160 come into uniform abutment and into their locked conditions because they are in three pairs, so that the loose splines 151-3 and 152-3 absorb the aforementioned pitch errors and other errors, thereby further assuring the uniform abutment of rollers 159 and 160.

In a second modified embodiment shown in FIG. 15, a drive member 173 has the inner circumferential portion thereof formed with a plurality of equi-angularly spaced recessed portions 173a to thereby accommodate a cam member 183 having a recessed cam surface 177, so that elastic members 184 and 184 of rubber are disposed at the front and back of the cam member 183 in recessed portion 173a in the rotating direction of drive member 173. According to this embodiment, one of the pairs of rollers 179 and 180 first abut against a sloped portion of the recessed cam surface 177 at the initial stage of rotation of the drive member 173, whereby the cam member 183 of the roller of such pair compresses and deforms the elastic member 184 at either side according to the rotating direction of the drive member 173, thereby effecting a phase shift relative to drive member 173. The rollers 179 and 180 of the other pairs consecutively abut against sloped portions of recessed cam surfaces 177 of respective cam members 183 until the rollers of all the pairs are brought into their locked conditions.

In the construction thus far described, there is sandwiched between the bottom of the recessed portion 173a and the cam member 183 a friction reducing member 185, which has a sufficiently lower coefficient of friction than those between the recessed cam surface 177 and the rollers 179, 180 and between the rollers 179, 180 and driven shafts 171, 172 so that the cam member 183 can slide smoothly within the recessed portion 173a.

In accordance with a third modified embodiment for providing smooth sliding movement of the cam member, as shown in FIG. 16, a cam member 183' may be composed of two split halves 183'-1 and 183'-2 which are attached to the front and back surfaces of a recessed portion 173'a through an elastic member 184'. The recessed portion 173'a, within which the cam member 183' is permitted to slide, may have its bottom set accurately or substantially in the tangential direction which is opened at an angle $\theta$ with respect to the rotating direction of a drive member 173'.

Although in the foregoing embodiments of the roller-type clutch mechanism the rollers are set free of the retainer, in FIG. 17 the rollers 199 and 200 are positioned relative to a retainer 198 in accordance with a fourth modified embodiment of the second basic embodiment. More specifically, attached to the retainer 198 are two centering-set springs 203 and 203 in the form of a leaf spring or the like, which are in contact with the fronts and rears of the rollers 199 and 200 in the rotating direction of a drive member 193, so that the rollers 199 and 200 of each pair are held in their neutral positions with respect to the retainer 198. According to this embodiment, the rollers 199 and 200 of all the pairs can be simultaneously brought into their locked conditions faster than those of the aforementioned respective embodiments, and the uniform abutment of all the rollers 199 and 200 can be effected by elastic deformation of the rollers themselves and a recessed cam surface 197.

With reference to FIG. 18 which illustrates a fifth embodiment of the roller-type clutch mechanism, rollers 219 and 220 of all the pairs are held in their neutral positions with respect to a retainer 218 by the action of centering-set springs 223 and 223 in a manner similar to that of FIG. 17. A drive member 213 is constructed of outer and inner members 213-1 and 213-2 which are fitted one within the other by the engagement between a recessed portion 213-1a in an inner circumferential portion of the outer member 213-1 and a land portion 213-2a in an outer circumferential portion of the inner member 213-2. Initial gaps $S_1$ and $S_2$ are formed between the side walls of the recessed portion 213-1a and the front and rear sides of the land portion 213-2a, respectively. To the inner member 213-2, there is hingedly connected by means of a pin 225 a lever 224 having an end groove 224a thereof engaging with the pin 213-1b of the outer member 213-1 and an opposite end groove 224b thereof engaging with the pin 218a of the retainer 218. When the outer member 213-1 is rotated in an arbitrary direction C, as shown in FIG. 19(a), the retainer 218 is moved in the direction E opposite to the direction C by the locking motions of the lever 224 in a direction D. As a result, the rollers 219 and 220 of one of the pairs are forced into contact with sloped surface portions of the recessed cam surface 217, which is formed in an inner circumferential portion of the inner member 213-2, by the action of the centering-set spring 223, and the rollers of another pair are forced into contact with the sloped surface portions of the recessed cam surface by elastic forces of the respective centering-set springs at the time when the gap between the recessed portion 213-1a and the land portion 213-2a becomes as small as $S_3$. When the outer member 213-1 is further rotated, the gap $S_3$ disappears, as shown in FIG. 19b, whereupon the rollers of all the pairs are in uniform abutment, when the inner member 213-2 starts to rotate together with the outer member 213-1, so that the power from the drive member 213 is transmitted to the driven shafts 211 and 212 by the respective rollers being locked.

On the other hand, if one of the driven shafts assumes a higher speed so that the roller 220 is released from its locked condition, such roller 220 moves while warping the spring 223, thereby enabling differential motions of the driven shafts 211 and 212.

A clutch mechanism wherein sprags are provided as clutch members will be described hereinbelow in accordance with a third basic embodiment of the invention.

Figure 23A:
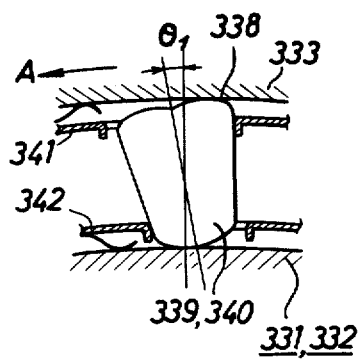

With reference to FIG. 20, a drive member 333 having a ring gear shape is rotatably fitted through bearings 335 and 336 upon the outer circumferential portions of flanged portions 331a and 332a of driven shafts 331 and 332 which are rotatable independently of each other due to the provision of a roller bearing 334 and which extend coaxially in opposite directions. Between the drive member 333 and the two driven shafts 331 and 332 are arranged a pair of sprags 339 and 340, provided separately for the driven shafts 331 and 332. As shown in FIG. 22, the top surface of each of the sprags 339 and 340, which faces the inner circumferential portion of the drive member 333, is formed with two symmetric bulging portions 337 and 338 which are separated in the front and back in the rotating direction of drive member 333, and which are formed with an arcuate shape. During normal operation (i.e., when the drive member is not rotating), the sprags 339 and 340 are loosely interposed, while assuming their upright positions, between the drive member 333 and the driven shafts 331 and 332. As shown in FIGS. 23(a) and (c), however, when the sprags 339 and 340 are tilted in the forward or backward rotating direction of the drive member 333, the bulging portions 337 and 338 are brought into abutment against the drive member 333 and into their locked conditions, so that one of the angles of play $\theta_1$ or $\theta_2$ is maintained between the initial upright position and the locked position.

Figure 23B:
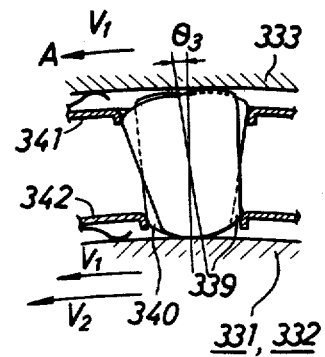

The sprags 339 and 340 are loosely held in a first retainer 341 at an outer circumferential side and in a second retainer 342 at an inner circumferential side, and retainers 341 and 342 are commonly shared by the two sprags 339 and 340. The aforementioned loose retension of the sprags is effected by fitting the sprags 339 and 340 in apertures 341b, 342b and 341a, 342a which are formed in the retainers 341 and 342, as shown in FIG. 21. If one of the sprags 339 and 340 is held in its locked condition while the other is released from its locked condition, as shown in FIGS. 23(b) and (d), angles $\theta_3$ and $\theta_4$ are defined by which the latter sprag can move up opposing the interference of the two retainers 341 and 342. Such angles are set to be smaller than the sum of the aforementioned play angles $\theta_1$ and $\theta_2$, as expressed by the inequalities $\theta_3 < (\theta_1 + \theta_2)$, and $\theta_4 < (\theta_1 + \theta_2)$. Leaf springs 343 and 344 have their respective ends jointed to the retainers 341 and 342 and their respective other ends elastically contacting an inner circumferential portion of the drive member 333 and outer circumferential portions of the driven shafts 331 and 332, whereby the first retainer 341 frictionally contacts the drive member 333 and the second retainer 342 frictionally contacts the driven shafts 331 and 332.

Figure 23C:
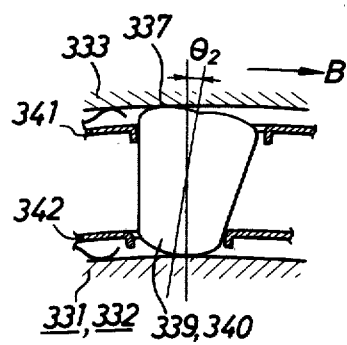

When the drive member 333 rotates forwardly in the direction A, as shown in FIG. 23(a), the sprags 339 and 340 are tilted in the direction A by the retainer 341 which is in frictional contact with the drive member 333 so that the power of the drive member 333 is transmitted to both the driven shafts 331 and 332 by the locked abutment between the bulging portion 338 and the drive member 333. On the other hand, if the drive member 333 rotates backwards in the direction B, as shown in FIG. 23(c), the sprags 339 and 340 are tilted in the direction B and locked in the backward position by the bulging portion 337 so that the drive member 333 and the driven shafts 331 and 332 are likewise connected.

If either of the two driven shafts 331 and 332 is rotated at a higher speed $V_2$ than a speed $V_1$ of the drive member by an external force while the drive member 333 is rotating forwardly, the sprag 340 arranged for example on the side of the driven shaft rotating at speed $V_2$ is released from its locked condition so that it tends to move up from the tilted position shown in FIG. 23(a) to its upright position. Then, the second retainer 342 is either pushed by the rising sprag 340 or pulled by the driven shaft rotating at the speed $V_2$ so that it slides in the direction A. However, such sliding movement has the maximum stroke thereof determined by abutment with the lower portion of the other sprag 339 which is still left under its locked condition. On the other hand, the first retainer 341 is slidably moved in the direction opposite to direction A by the pushing action of the rising sprag 340, but such sliding movement is limited by the first retainer 341 which abuts against the upper portion of the other sprag 339. As a result, because the retainers 341 and 342 are brought into substantially stationary conditions although they are permitted to slide slightly, the rising motion of the sprag 340 is confined by such two retainers 341 and 342 so that the sprag 340 can move up by the angle $\theta_3$. Because angle $\theta_3$ is set to be smaller than the sum of the play angles $\theta_1$ and $\theta_2$ between the two locked positions of the sprag, the sprag 340 is not tilted to the backward locked position but is held in its neutral position. As a result, the driven shaft rotating at the speed $V_2$ is permitted to rotate freely of the drive member 333, whereas only the remaining driven shaft rotates at the same speed $V_1$ as that of the drive member 333.

Figure 23D:
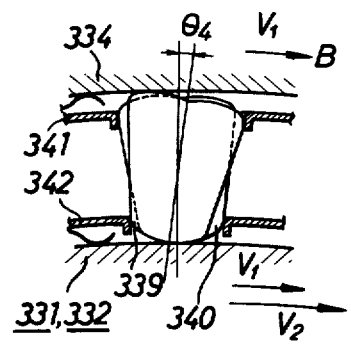

On the other hand, if one of the driven shafts 331 and 332 assumes the speed $V_2$ while the drive member 333 is rotating backwards, the sprag rising angle is $\theta_4$ at most, as shown in FIG. 23(d), so that a clutch action similar to the aforementioned ones can be realized, as will be readily understood.

In order to increase the transmission torque capacity in the sprag type clutch mechanism thus far described, a plurality of pairs of the sprags may be arranged in the circumferential direction of the drive member and the driven shafts. Modified embodiments of the sprag-type clutch mechanism, which can effect uniform abutment of the sprags even when there are errors in the shape or size of the sprags, are described hereinbelow.

In a first embodiment of the sprag-type clutch mechanism, shown in FIG. 24, driven shafts 351 and 352 are constructed, respectively, of combinations of inner members 351-1 and 352-1 and outer members 351-2 and 352-2 comprising the shaft bodies, both of which are jointed by means of loose splines 351-3 and 352-3 having play in the circumferential and radial directions. As shown in FIG. 25, three pairs of sprags 359 and 360 are equi-angularly arranged in the circumferential direction. During rotation of a drive member 353, the sprags 359 and 360 of all the pairs are centered by the loose splines 351-3 and 352-3 when they uniformly abut against the outer circumferential portions of the outer members 351-2 and 352-2 or they are all locked, because there are three pairs of sprags 359 and 360. In other words, when such centering is effected, all the sprags 359 and 360 are brought into uniform abutment.

In a second modified embodiment shown in FIG. 26, centering-set springs 385, 385 and 386, 386, such as loaf springs, contacting the fronts and backs of sprags 379 and 380 in the rotating direction of a drive member 373, are attached to first and second retainers 381 and 382. Respective sprags 379 and 380 are held upright in their neutral positions with respect to the retainers 381 and 382. According to this arrangement, the sprags 379 and 380 can be substantially simultaneously brought into their locked conditions at the initial stage of rotation of the drive member 373 more quickly than in the embodiment in which the sprags are not held upright, and the springs 385 of the first retainer 381 in frictional contact with the drive member 373 push and tilt the sprags 370 and 380, whereby the elastic warp of the springs 385 and 386 absorb the aforementioned errors to thereby bring the sprags 379 and 380 of all the pairs into uniform abutment.

In a third modified embodiment shown in FIG. 27, centering-set springs 405, 405 and 406, 406 are attached to retainers 401 and 402 in a manner similar to the embodiment described with reference to FIG. 26. A drive member 393 comprises the combination of outer and inner members 393-1 and 393-2, both of which are formed to have a ring shape and which are slidable relative to each other. The outer and inner members 393-1 and 393-2 are fitted one within the other at a recessed portion 393-1a in an inner circumferential portion of the outer member and at a land portion 393-2a in the outer circumferential portion of the inner member. The land portion 393-2a is spaced at initial gaps $S_4$ and $S_5$ from the side walls of the recessed portion 393-1a. On the other hand, the outer member 393-1 is formed over its entire circumference with a groove 407, in which a rod 409 is arranged in a facing manner so as to have its base end fixed to the first retainer 401 and to loosely extend through a slot 408 formed in the inner member 393-2. The rod 409 is provided at its leading end with a leaf spring 403, which is in frictional contact with the groove 407. With such arrangement, the first retainer 401 is also brought into frictional contact with the drive member 393 by the action of the leaf spring 403.

When the outer member 393-1 rotates in an arbitrary direction C, as shown in FIG. 28(a), the retainer 401 is moved in the same direction as the direction C so that one of the pairs of sprags 399 and 400 are pushed and tilted into their locked positions by the spring 405. At the time when the gap between the recessed portion 393-1a and the land portion 393-2a is reduced to $S_6$ by continued rotation of the outer member 393-1, the sprags of another pair are tilted into their locked positions by the elastic forces of the other centering-set springs which are provided for each pair. As a result, as shown in FIG. 28(b), at the time when the recessed portion 393-1a and the land portion 393-2a are brought into abutting engagement such that the inner member 393-2 starts its rotation together with the outer member 393-1, uniform abutment is effected at sprags 399 and 400 of all the pairs, by which driven shafts 391 and 392 are rotated. If one of the driven shafts 391 or 392 assumes a higher speed, the specified sprags, which are released from their locked conditions, move up while warping the springs 405 and 406 in a manner similar to the case in which rollers are employed as the clutch members, although not shown in the accompanying drawings.

It will be understood that the rod 409 need not necessarily be made to loosely extend in the slot 408 of the inner member 393-2, and the same clutch action as described hereinabove can be attained even when the rod 409 is fixedly extended through the inner member 393-2.

If the clutch mechanism according to the present invention is to be used as a differential locking mechanism of a vehicle as exemplified in the forms of respective clutch mechanisms of the ratchet, roller and sprag types described hereinabove, the engine torque can be uniformly distributed to the two drive wheels, even when one of the drive wheels is trapped on a slippery road surface so that it is held under a light load condition, so that the differential locking effects can be completely accomplished.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A clutch mechanism for a power transmission system having one drive member and two driven members, comprising:

at least one pair of clutch members interposed between said drive member and said two driven members so as to transmit the rotational power of said drive member to said driven members independently of each other when said drive member rotates;

said pair of clutch members being constructed so as to operatively cooperate with said drive member and said drive members such that one of said driven members, which is rotating at a higher speed than said drive member due to external force, is set free from said drive member while said power from said drive member is transmitted to the other driven member;

said pair of clutch members comprising a pair of pawls which are hingedly connected in a rocking manner to said drive member and which are biased to be opened;

said two driven members being respectively formed with a radially inner row of helical teeth and a radially outer row of helical teeth, said inner and outer rows of helical teeth being arranged to face each other and being dimensioned and shaped to engage with and disengage from said pawls;

the distance between the leading ends of said pawls at the minimum angle therebetween being set to be larger than the distance between the corresponding opposed protruding portions of said inner and outer rows of said helical teeth and smaller than the distance between the protruding portions of one row of said helical teeth and corresponding opposed recessed portions of the other row of said helical teeth;

said two driven members having a common substantially horizontal axis; and said pair of pawls being hingedly movable to substantially the radial direction of said common axis.

2. A clutch mechanism according to claim 1, wherein:

said two driven members comprise axle shafts of a vehicle, each equipped with a drive wheel; and said drive member comprises a propeller shaft to which power from a prime mover of said vehicle is transmitted.

3. A clutch mechanism according to claim 1, wherein:

said inner and outer rows of helical teeth are arranged to face each other in the radial direction of said common axis, and are shifted apart in the axial direction of said common axis.

4. A clutch mechanism according to claim 1, wherein:

said pair of pawls are coaxially hingedly connected to said drive member such that said minimum angle therebetween is determined by interference of a stepped portion which is formed in at least one of said pawls.

5. A clutch mechanism according to claim 1, wherein:

one pawl of said pair of pawls which is engageable with said radially inner row of said helical teeth carries a balance weight which extends apart from the hinged portion of said pawls.

6. A clutch mechanism according to claim 1, wherein:

each of said two driven members is formed with a flanged portion, the flanged portion of one of said driven members being larger than the flanged portion of the other of said driven members; and said radially outer row of helical teeth is formed on an inner circumferential portion of said larger flanged portion of said one driven member and said radially inner row of helical teeth is formed on an outer circumferential portion of said flanged portion of said other driven member.

7. A clutch mechanism according to claim 1 or 6, wherein:

an end of one of said two driven members is rotatably fitted in a substantially hollow cylindrical end of the other of said driven members.

8. A clutch mechanism according to claim 7, wherein:

said drive member is rotatably fitted on an outer circumferential portion of said other driven member.

* * * * *